G. G. BELL & J. ST. V. PLETTS.
METHOD AND APPARATUS FOR HEATING.
APPLICATION FILED JAN. 29, 1913.
1,069,378.
Patented Aug. 5, 1913.
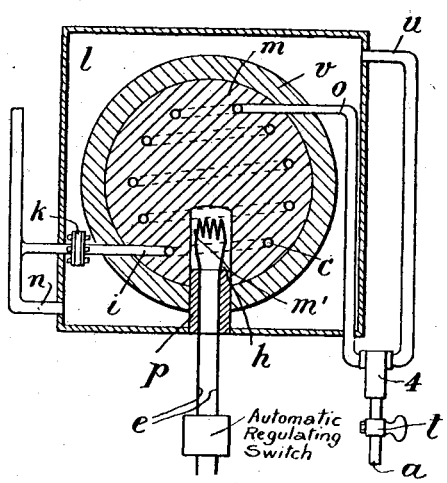

UNITED STATES PATENT OFFICE.

GEORGE GILBERT BELL, OF LONDON, AND JOHN ST. VINCENT PLETTS, OF TEDDINGTON, ENGLAND, ASSIGNORS TO ELECTRIC HEAT STORAGE COMPANY, A CORPORATION OF NEW YORK.

METHOD AND APPARATUS FOR HEATING.

1,069,378.      Specification of Letters Patent.      Patented Aug. 5, 1913.

Original application filed September 25, 1909, Serial No. 519,558. Divided and this application filed January 29, 1913. Serial No. 744,833.

*To all whom it may concern:*

Be it known that we, GEORGE GILBERT BELL, and JOHN ST. VINCENT PLETTS, subjects of the King of Great Britain, residing, respectively, at 14 Addison Court Gardens, London, England, and 43 Clarence road, Teddington, in the county of Middlesex, England, have invented a new and Improved Method and Apparatus for Heating, of which the following is a specification.

This invention relates to a new and improved method of heating water or other liquid by electricity, and the apparatus therefor.

The usual method of heating water electrically consists in placing the quantity of water required to be heated in an electrically heated vessel, which may or may not be provided with a heat insulating coating. Such a method, however, is only capable of heating a predetermined quantity of water and requires a certain time to produce the temperature required while it makes a large and brief demand upon the electric supply.

The present invention is characterized by electrically heating a heat accumulator or mass of a substance capable of storing heat and in imparting that stored heat to water as and when required. Moreover, according to this invention, it is possible to consume the electrical energy either continuously, or during those hours of the day when it may be purchased most cheaply for the purpose of storing up a considerable amount of heat representing the accumulation produced by the application of a smaller amount of electric energy for a period of time, and to deliver the hot water whenever required in any quantities up to a maximum, depending on the size of the apparatus. The latter consists, in its simplest form, of a heat accumulator or mass of a substance capable of withstanding a high temperature having a high specific or latent heat value, and it should be a good conductor of heat so as to impart its heat equally to the water. Iron, for example, is a suitable material to employ, and a mass of iron is provided with a duct or coil of pipe embedded therein or passing through the same for the passage of the water, and an electric heating device, both the coil and the heater being surrounded by a heat insulating coating or jacket. The mass being heated transmits heat to the pipe coil and thus heats the water in or passing through the same; and means are provided for mixing the steam or hot water with cold water to give the temperature required. The mass of iron may have any shape, but it is desirable that it should have the least possible surface for its volume in order that the escape of heat may be a minimum, and it is therefore preferable to cast a sphere of iron about a coil of pipe, through which passes the water to be heated. The coil of pipe may be of any length and may be arranged so that there is an equal volume of iron within and without the convolutions, and the pipe may be of any section or may be corrugated in order to give a large surface so that the heat may be imparted sufficiently quickly to the water passing through it.

The heat may be produced by passing the electric current through a resistance of any kind, or in the case of an alternating current, by the hysteresis of a core around which the current passes, or by the passage of a secondary induced current through a circuit of any form, or by any combination of these methods, and the heating device of the apparatus may be within or without the mass of iron, or the mass of iron may itself form part of the heating device. In the case of an alternating current with a secondary heat-producing circuit, the primary circuit may be separated from the mass of iron by a layer of heat insulating material, or may be entirely outside the insulating coating so that it conducts away as little heat as possible from the mass of iron.

The insulating coating surrounding the mass of iron and the heating device may be made of any substance which is a good heat insulator, and of any thickness, and it may if desirable for strength or otherwise, have an external or internal metal sheathing, or it may consist of a double sheathing with a vacuum between the walls, and the external and internal surfaces of the sheathings may be polished or silvered to minimize radiation.

The steam or hot water produced by the passage of the water through the hot mass of iron may be mixed with cold water either by employing a thermostatic valve or cock which causes the water to issue at a practically constant temperature, or by employing an injector or mixing nozzle which picks up sufficient water to condense the steam, or by employing a hand-regulated valve or cock by means of which the temperature of the water can be varied as desired.
It is evident, since there is no material which is a perfect heat insulator, that a certain amount of heat must escape from the hot mass of iron, and the latter is therefore preferably placed, together with its insulating coating, within a tank from which the cold water to be converted into steam or hot water, or to be mixed with the steam or hot water, may be drawn if desired, so that the heat escaping is not lost. This tank may also be provided with a heat insulating coating.

The current used in this apparatus for heating may be obtained from a source on which the demand is variable, and when the demand is at its maximum and can take all the supply, the current to the heating apparatus of this invention is adapted to be cut off by any known form of automatic switch.

Referring now to the drawing accompanying this specification and forming a part hereof, in which one form of our invention is embodied, Figure 1 represents an apparatus embodying our improvement capable of carrying out our improved process; Figs. 2, 3 and 4 represent different forms of valves for controlling the discharge of the heated liquid, Fig. 2 being a section through a thermostatic valve, and Figs. 3 and 4 being vertical and horizontal sections through a hand-operated valve; and Fig. 5 is a vertical section through washer $k$.

Referring to Fig. 1 of the drawing, $m$ is a heat accumulator consisting of a mass of iron provided with a coating $v$ of insulating material. $h$ is an electric heater arranged in the interior of mass $m$. The mass $m$ and the heater $h$ are placed within a tank $l$. $p$ is a plug inserted into the mass $m$ and its insulating coating $v$ for carrying the electric mains $e$. These electric mains $e$ are preferably provided with an automatic regulating switch arranged preferably for automatically cutting off the supply of current at the times when the demand upon the electric circuit is the greatest; that is, during the so-called peak hours. The tank $l$ is provided with an inlet pipe $n$ connecting with a source of water supply and an outlet pipe $u$. $c$ is a coil of pipe arranged in the mass $m$ and having an inlet pipe $i$ connected with the water supply pipe and passing through the walls of tank $l$ to coil $c$. $o$ is the outlet pipe of the coil $c$. The outlet pipes $u$ and $o$ connect at the point 4 which may consist of a thermostatic valve. $t$ is the cock of the orifice pipe $a$. When the cock $t$ is turned, water will flow both through the mass of iron $m$ and tank $l$ and be mixed at the valve 4 in any proportions desired, so that it will issue from the orifice $a$ at a substantially constant temperature or at any temperature desired.

In Fig. 2, which is a section on a larger scale, of the thermostatic valve shown in Fig. 2, $o'$ is the inlet for the steam or hot water issuing from the coil through pipe $o$. $n'$ is the inlet for the colder water from pipe $u$, and both inlets are partially closed by the valves which are carried on the rod $f'$. The inlets $o'$ and $n'$ screw into the barrel $d$ which is provided with a projection $d'$ and is threaded at $t'$ for attachment to a cock. A rod of metal $z$ having a smaller coefficient of expansion under the action of heat than the metal of the barrel $d$, is fixed to the latter as by the screw $z'$ and the valve rod $f'$ is pivoted to the barrel projection $d'$ at $d^2$ and pivotally connected to the metal rod $z$ at $z^2$, so that if the water passing through the outlet duct or barrel $d$ increases in temperature, it will cause the barrel $d$ to expand more than the rod $z$, thus moving the valve rod $f'$ and valves $f$ about the pivot $d^2$ in a direction which closes the inlet $o'$ and opens the inlet $n'$. If the temperature of the water decreases, the action is the reverse, with the result that the water issuing at $t'$ will be maintained at practically a constant temperature. In place of the thermostatic valve 4 and its cock, we may use a hand-regulated valve to vary the proportions of water issuing from the pipes $o$ and $u$ as desired, so as to obtain any desired temperature of water, such a valve and cock as shown in Figs. 3 and 4. In Fig. 3, which is a vertical section of such a hand-regulated valve, $o'$ is the inlet for the steam or hot water issuing from the pipe $o$. $n'$ is the inlet from the pipe $u$ and $a$ is the common outlet. A tapered plug $g$ having passages $w$ and $x$, fits into the top part of the barrel $d$ and is held in place by the screwed cover $q$ and made water-tight by the washer $r$. The plug $g$ is also fitted with a handle $g'$ and nipple $w'$ which, projecting into the constricted portion of the barrel $d$, insures the proper mixture of the steam or hot water coming through the inlet $o'$ and passage $w$ with the less heated water coming through the inlet $n'$ and passage $x$. The use of the hand valve of Fig. 3, or the thermostatic valve of Fig. 2 involves the periodic or intermittent withdrawal of hot water or steam from the coil $c$ or of the less heated water from the tank $l$, and the corresponding periodic or intermittent withdrawal of heat from the accumulator $m$ or the tank $l$.

In Fig. 4 it is seen that the passages

$w$ and $x$ in the plug $g$ are so arranged that, as the plug $g$ is turned, the passage $x$ first opens to the inlet $n'$ and then, as it is closing, the passage $w$ opens to the inlet $o'$ until, when the latter is wide open, the former is just closed, thus enabling the steam or hot water from the coil $c$ to be mixed with the colder water from the tank $l$ in any desired proportion.

In Fig. 5, which is a section on a larger scale, of the insulating washer shown at $k$ in Fig. 1, $b$ is the pipe provided with flanges $b'$ which are separated by the insulating washer $k$. The joints between the flanges $b'$ and the insulating washer $k$ are made water-tight by means of the bolts $s$ which are fitted at each end with insulating collets $k$, so that there is no metallic connection between the bolts $s$ and flanges $b'$ and the conduction of heat along the pipe $b$ is therefore greatly retarded.

Any suitable form of automatic electric switch may be employed for the purpose of cutting off the current when the maximum demand is being made on the electric supply as, for instance, an electromagnetic switch which automatically opens upon a predetermined voltage drop in the main circuit.

The material of the accumulator has high latent heat value which is to be taken in the sense of a capacity for storing a considerable amount of heat whether such heat be latent or specific in the strict technical sense.

The present application is a divisional application of one filed by us in the United States Patent Office September 25, 1909, for a method of producing hot water, etc., bearing Serial No. 519,558.

What we claim as new and desire to secure by Letters Patent, is:

1. The method of heating water and of supplying the water at any desired temperature, which consists in electrically heating a relatively small amount of water to a high temperature, conserving the heat in excess of that required to heat said small amount of water and employing it to heat a large amount of water to a lower temperature, drawing off the heated water simultaneously from both sources in varying amounts from each as desired, and discharging the same from a common outlet, whereby water may be supplied at variable temperature.

2. A system for electrically heating water and supplying it at any desired temperature, comprising a source of electricity, an electric heater supplied with electricity from said source, to heat a relatively small amount of water to a high temperature, conserving the heat in excess of that required to heat said small amount of water in a heat accumulator, means to contain a large amount of water heated by said accumulator to a lower temperature, and means to simultaneously draw off the heated water from both sources in varying amounts as desired and discharge the same from a common outlet.

3. A system for electrically heating water and supplying it at any desired temperature, comprising a source of electricity, an electrical heater supplied with electricity from said source, means to cut off the electric supply to the heater when demand on the source is at its maximum, a heat accumulator heated by said heater and containing a small amount of water heated to a high temperature, means to contain a large amount of water heated to a lower temperature by the accumulator, and means to draw off the heated water simultaneously from both amounts of water in varying quantities and discharge the same from a common outlet.

4. In an electric heater for liquids, the combination with two receivers one of larger and the other of smaller capacity, both receivers being permanently connected with a source of supply, of an electric heating device arranged to heat the receiver of lesser capacity to a higher degree than the other, and a mixing cock for withdrawing the contents of both receivers jointly.

5. In an electric heater for liquids, the combination with two receivers for the liquid to be heated both permanently connected to a source of supply, of a heat accumulator for one receiver, an electric heater for said accumulator, and a mixing cock communicating with both receivers.

6. A system for electrically heating fluid and supplying it at any desired temperature, comprising an electric heater adapted to heat a relatively small amount of water to a high temperature and to conserve the heat in excess of that required to heat said small amount of water, means to contain a large amount of water heated by said excess heat to a lower temperature, and means to simultaneously draw off the heated water from both sources in variable amounts as desired and discharge the same from a common outlet.

In testimony whereof, we have signed our names to this specification, in the presence of two subscribing witnesses.

GEORGE GILBERT BELL.
JOHN ST. VINCENT PLETTS.

Witnesses:
H. D. JAMESON,
W. MORBEY.

Copies of this patent may be obtained for five cents each, by addressing the "Commissioner of Patents, Washington, D. C."